Aug. 18, 1953  C. A. FRICK  2,649,352
MACHINE FOR RECORDING TIME ON AND STORING COIN CARRIERS
Filed April 23, 1948  3 Sheets-Sheet 1
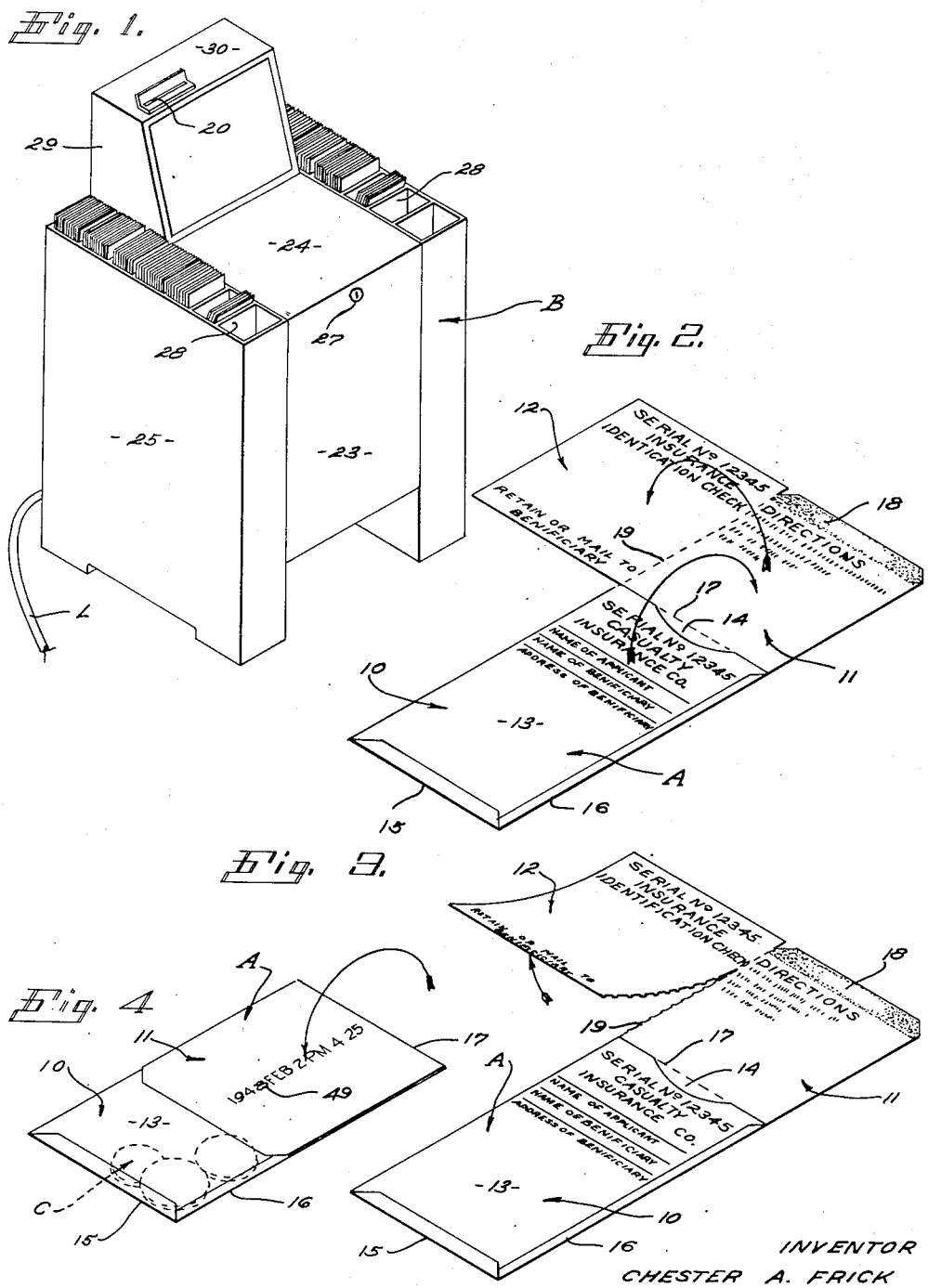
INVENTOR
CHESTER A. FRICK
BY
ATTORNEY

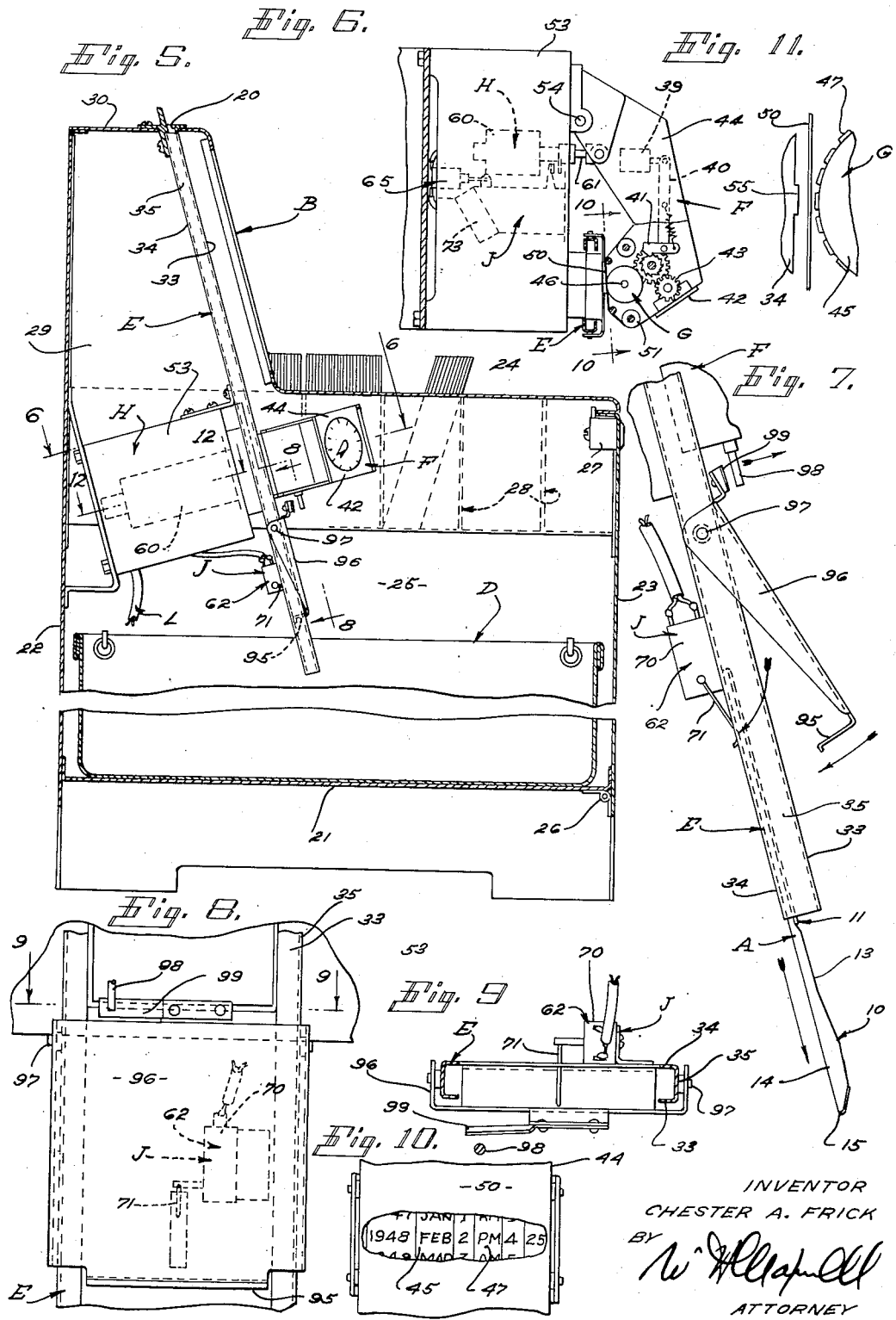

Aug. 18, 1953         C. A. FRICK         2,649,352
MACHINE FOR RECORDING TIME ON AND STORING COIN CARRIERS
Filed April 23, 1948         3 Sheets-Sheet 3
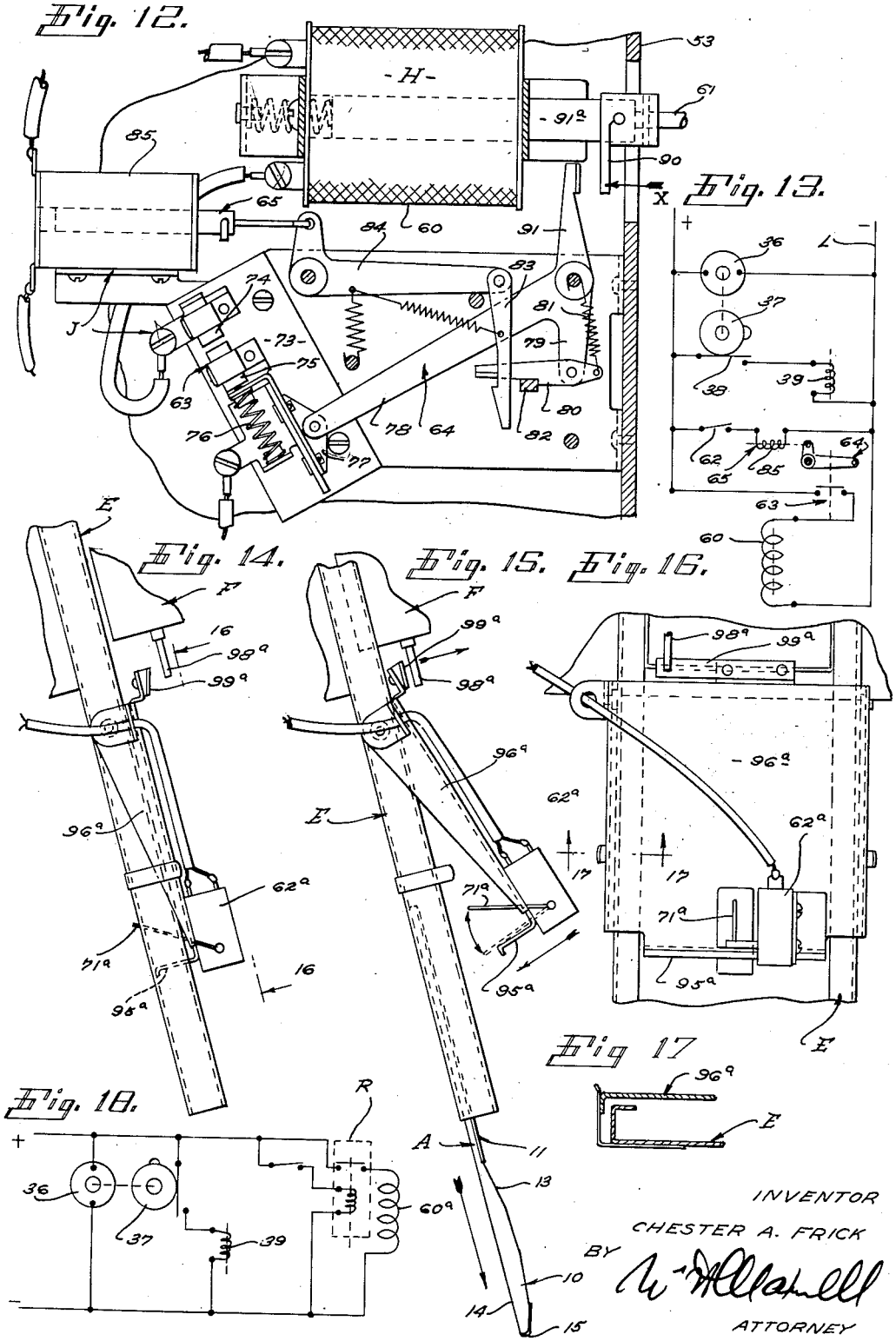
INVENTOR
CHESTER A. FRICK
BY
ATTORNEY Patented Aug. 18, 1953

2,649,352

UNITED STATES PATENT OFFICE 2,649,352

MACHINE FOR RECORDING TIME ON AND STORING COIN CARRIERS

Chester A. Frick, Glendale, Calif., assignor to Leo M. Harvey, Los Angeles, Calif.

Application April 23, 1948, Serial No. 22,893

11 Claims. (Cl. 346—22)

This invention has to do with a machine for handling a coin carrier such as may incorporate a legal or business document, it being a general object of the invention to provide a machine operable to receive and store to hold in safe keeping a coin carrier or document with a record of the time that the carrier or document was deposited in the machine.

The present invention provides a machine that can be used to advantage in the conduct of certain business operations, as for example, in the sale or execution of insurance contracts, and it is particularly useful for handling, storing and recording articles such as coin carriers or coin carrying envelopes or documents such as may be part of or incidental to the business transaction to be executed.

Although the machine of the present invention may be employed to handle articles or documents of various kinds and may be used in connection with or incidental to carrying out various business transactions, it is particularly practical for the handling of coin carriers or coin carrying envelopes bearing written evidence of an application or a contract concerning insurance. For this reason in the following disclosure specific reference will be made to a coin carrier in the nature of an envelope and to an adaption or application of the invention particularly suited to the handling of an application or contract involving insurance.

In the present application the coin carrier to be handled by the machine is illustrated as an envelope type of carrier with printed matter thereon, and with spaces on which writing may be applied, to the end that the carrier constitutes an application or possibly a contract concerning insurance.

The machine provided by the present invention acts primarily as a depository or storage receptacle acting to hold coin carriers or applications or contracts or combined coin carriers and applications or contracts, and it acts to record the time at which such documents or articles are deposited in the machine.

It is a general object of the present invention to provide a machine of the character referred to which serves to mark directly upon the documents or articles deposited therein the time at which they are so deposited.

A further object of the present invention is to provide a machine of the general character referred to which is fully automatic and requires no manipulation, actuation or acts upon the part of the person depositing the material in the machine other than the mere insertion of the material into the chute of the machine provided for that purpose.

Another object of the present invention is to provide a machine of the general character referred to which is simple, practical and dependable making it commercially practical and economical to operate.

The various objects and features of my invention will be fully understood from the following detailed description of typical preferred forms and applications of the invention, throughout which description reference is made to the accompanying drawings, in which:

Fig. 1 is a perspective view of a machine embodying the present invention. Figs. 2, 3 and 4 illustrate a coin carrier such as may be effectively handled by the machine, Fig. 2 showing the carrier in the manner in which it is initially received by or made available to an applicant or a person wishing to enter into a contract of insurance, Fig. 3 being a view similar to Fig. 2 showing a portion of the coin carrier in the course of being removed or detached to serve as a receipt or identification coupon, and Fig. 4 being a view showing the coin carrier in the form in which it is introduced into the machine and after it has been deposited in the machine to bear a record of its time of deposit. Fig. 5 is a vertical sectional view of the machine as shown in Fig. 1. Fig. 6 is a sectional view taken as indicated by line 6—6 on Fig. 5. Fig. 7 is an enlarged view of the lower end portion of the chute incorporated in the machine showing the stop included in the chute in an open or released position. Fig. 8 is an enlarged view taken as indicated by line 8—8 on Fig. 5. Fig. 9 is a detailed sectional view taken as indicated by line 9—9 on Fig. 8. Fig. 10 is an enlarged view taken as indicated by line 10—10 on Fig. 6. Fig. 11 is an enlarged transverse sectional view taken at the point where the printer head operates to print a record upon a carrier introduced into the machine. Fig. 12 is an enlarged view of a portion of the mechanism showing elements of the control for the actuating means that operates the printing head. Fig. 13 is a wiring diagram of the electrical circuit included in the machine illustrated in the preceding figures. Figs. 14 to 18, inclusive, illustrate a modified form of construction, Fig. 14 being a side view of the lower end portion of the chute in which the modified construction is incorporated and showing the parts in position ready to receive a coin carrier and Fig. 15 being a view similar to Fig. 14 showing the stop at the chute open and showing a coin carrier being delivered by the chute. Fig. 16 is a front elevation of the structure shown in Figs. 14 and 15, being a view taken as indicated by line 16—16 on Fig. 14. Fig. 17 is an enlarged detailed sectional view taken as indicated by line 17—17 on Fig. 18 being a diagram of the electrical circuit employed in the form of the invention shown in Figs. 14 to 17, inclusive.

The coin carrier A illustrated in the drawings and particularly in Figs. 2 to 4 of the drawings, involves, generally, a body portion 10, a flap or closure 11 and a detachable tab 12 which may be employed as a receipt or as an identification stub. The body 10 and flap 11 combine to form an envelope-like structure, the body being formed of front and back panels 13 and 14 joined together along their bottom edges 15 and their side edges 16, but unjoined or free at their upper edges where the pocket-like structure of the body is open. The flap 11 continues from or is a continuation of one of the panels of the body, say for instance, the back panel 14 of the body, and is adapted to be folded on or along the line 17 of joinder between the panel 14 and the flap 11 so that it overlies the outer side of the other panel or of the top 13. In the preferred form of the invention suitable sealing means such as adhesive is applied to the flap 11 as at 18, so that it may be secured in the folded position as shown in Fig. 4.

The tab 12 is joined to a suitable or convenient part of the envelope structure above described. In the preferred form of the invention the tab is joined to the flap along the side edge 19 thereof so that it projects laterally from the envelope structure whether the envelope structure be open as shown in Fig. 2, or be closed with the flap secured to the top 13 of the body. In thus projecting from the envelope the tab is conspicuous and must be removed before the envelope is deposited in the machine, the opening in the machine being such as to receive an article only as wide as the envelope and being so formed that it will not receive an article as wide as the combined envelope and tab. It will be apparent that the line of joinder between the tab and the flap may be perforated or otherwise weakened so that the tab is readily detached by tearing it or moving it in the direction indicated by the arrow in Fig. 3.

The several parts of the carrier may be marked as by printing or writing to carry out the desired transaction, for example, to constitute the desired application or the desired contract, as the case may be. In an ordinary situation such as is indicated in the drawings the several parts of the carrier bear printed matter and, in effect, constitute a form to be filled in as by writing, to the end that the document becomes complete either as a contract or application. In the particular case illustrated the tab 12 constitutes merely an identification member or receipt-like part that can be retained either by the purchaser or depositor of the carrier in the machine, or it may be forwarded to a beneficiary or other desired person. In the case illustrated the flap is shown printed with directions while the body of the carrier bears suitable printed matter and is provided with spaces to be filled out by the applicant to complete the transaction.

It is to be understood that the coin carrier A as above described may be advantageously formed of paper or like material and that it may, in practice, be shaped and proportioned to readily receive one or more coins C such as may be incidental to or required by the transaction being carried out.

The machine involving the present invention may, in practice, vary widely in form or character. However, a typical embodiment of the invention includes, primarily a housing B, a bin or receptacle D within the housing, a chute E within the housing extending from an inlet opening 20 in the housing to a point where it delivers coin carriers into the bin D and a recorder within the housing.

The recorder provided within the housing is actuated by or through the coin carrier in the course of its introduction to the bin D through the chute E and preferably serves to record the time of deposit of the carrier into the machine directly upon the carrier itself. The particular recorder illustrated in the drawings and embodying the present invention involves, generally, a time keeper F, a printing head G, an operating means H for the printing head, and a control J for the operating means H.

The housing B is a box-like structure involving a bottom 21, a back 22, a front 23, a top 24 and sides 25. In accordance with the invention provision is made for gaining access to the interior of the housing and in the case illustrated this is accomplished by pivotally securing the front 23 of the housing as by a hinge connection 26. A suitable lock 27 normally maintains the front 23 in closed position, as shown throughout the drawings. In the particular form of machine illustrated suitable bins or receptacles 28 are provided in or at the top 24 of the housing to hold a supply of carriers A such as are illustrated on sheet 1 of the drawings, and in the particular form of the invention illustrated the rear portion of the top 24 has an upstanding portion or upwardly extending projection 29, the top 30 of which is provided with the access opening 20 through which the coin carriers are introduced into the machine. It is to be understood, of course, that the access opening 20 is preferably so proportioned as to receive the coin carrier in a form such as appears in Fig. 4 of the drawings or after the tab 12 has been detached through a process such as is illustrated in Fig. 3.

The chute E may, as shown in the drawings, be a straight simple chute depending from the top portion 30 of the housing downwardly and into the lower portion of the housing to such position as to advantageously deposit coin carriers into the bin D located in the housing. In the preferred arrangement the bin D is a simple open-topped box or basket-like structure normally resting on the bottom 21 of the housing and accessible through the front of the housing when the front 23 is swung to an open position.

The particular chute E illustrated in the drawings has parallel front and back walls 33 and 34 respectively, and end or side walls 35, the structure being such that the chute parts establish an elongate passageway that adequately receives or handles the coin carriers A upon their being deposited in the machine endwise through the opening 20. The chute is arranged in a substantially vertical or upright position so that the carriers deposited in the chute at its upper end move downwardly through it under the action of gravity. The chute in the drawing is shown slightly inclined to accommodate parts of the mechanism which must be included in the machine.

The time keeper F of the recorder is preferably a clock-like mechanism and in the particular case illustrated it involves, generally, a synchronous motor 36 permanently connected in the main power line L supplying an alternating electric current to the machine for its operation. The motor 36 drives or operates a suitable cam 37 which controls or operates a switch 38 so that the switch is momentarily closed at definite or fixed time intervals. The switch 38 controls a ratchet solenoid 39 connected in or across the power line L through the switch 38. The ratchet solenoid 39 operates a rocker arm 40 carrying a pawl 41 of a ratchet mechanism that drives the printing head. Through the construction above described, all of which is more or less typical of time stamp mechanisms, the printer head is operated regularly at fixed intervals of time, and upon each operation it is advanced a predetermined amount.

The timer or time keeper preferably includes an indicator or dial mechanism 42 geared to the ratchet mechanism by a suitable gear train 43, so that a person inspecting the machine can readily determine whether or not it is set at the proper time.

The printing head G involves, generally, a case 44 which may also carry parts of the mechanism just described, as will appear from Fig. 6 of the drawings. The printing head also includes a plurality of printing wheels 45, preferably carried on a single or common shaft 46 so that their peripheries are in register or in a common plane. The peripheries of the printer wheels 45 carry suitable marking devices or type members 47 which may be such as to apply markings to a carrier A such as are shown at 49 in Fig. 4 of the drawings. It is to be understood that the several wheels 45 of the printing head may be driven from or through an advancing or additive movement mechanism such as is characteristic of time stamps.

The printing head shown in the drawings may also involve an inking means such as an inking ribbon 50 carried on suitable rollers or spools 51, and it is to be understood that the mechanism may, in practice, include means for suitably advancing the ribbon as circumstances require. The details of the movement mechanism included in the printing head and of the drive for the inking ribbon, etc. have been eliminated from the drawings since they are no part of the present invention and may, in practice, be mechanisms such as are common to devices of this general character.

The operating means H for the printing head involves broadly a means acting to shift the group of printing wheels 45 relative to the chute or relative to a coin carrier in the chute, in such manner as to print upon the coin carrier. In the particular case illustrated the case 44 which carries the printing head and parts of the time keeper F is pivotally connected to a base 53 suitably fixed in the housing B. The pivotal connection is established through a pivot pin 54. The mounting of the case is such that the printing wheels 45 of the printing head are disposed at an opening in the front 33 of the chute to be opposite an abutment or platen 55 at the back or rear wall 34 of the chute opposite the said opening. The mounting of the case is such that the printing head may be moved between an unactuated position where the wheels 45 are withdrawn from the chute and an actuated position where the wheels 45 enter the chute in a manner to print upon a carrier A that may be between the wheels and the platen 55.

The operating means also includes a power solenoid 60 fixed in the base and operatively coupled with the case 44 by a suitable link 61, the structure being such that when the winding of the solenoid 60 is energized the case 44 is pivoted about the pin 54 in a manner to move the printing wheels to operating position in the chute.

The control J in the form of the invention illustrated in Figs. 1 to 13 of the drawings involves, generally a master or control switch 62 controlled or actuated by a carrier disposed in the chute in a position to be printed upon by the printing head, a power switch 63 controlling the circuit to the winding of the power solenoid 60, latch means 64 normally holding the switch 63 in an open position, and a control means 65 for the latch means 64.

The master or control switch 62 is preferably located at or carried by the chute E and in the particular case illustrated it is mounted on a fixed or stationary part of the chute. In the drawings it is shown mounted on the rear or back side 34 of the chute at a point somewhat below the point at which the printer head G is located. The switch 62 may include any suitable contact mechanism carried in a suitable case 70 and it is shown as including an operating arm 71 which projects from the case and normally extends into the chute or passageway of the chute through a suitable opening in the back wall 34 of the chute. In practice the arm 71 may normally extend completely across the passage of the chute so that it is impossible for a carrier A to pass through the chute without actuating the arm. When the arm 71 is actuated or depressed by a carrier A in the chute to a position such is shown in Fig. 7 of the drawings, the switch 62 is closed.

The power switch 63 is preferably a heavy duty switch suitable for controlling the heavy circuit required to operate the power solenoid 60. In the particular case illustrated the switch 63 is shown as including a base 73 carrying a fixed contact 74 and a shiftable contact 75. The shiftable contact is normally urged toward the fixed contact by a spring 76 and is attached to a shiftable carrier 77 coupled with the latch means 64.

The latch means 64 serves to normally retain the movable contact 75 in a retracted position so switch 63 is open, as shown in Fig. 12 of the drawings. The particular latch means illustrated in the drawings involves, generally, a pivoted member having a lever arm 78 operatively connected to the contact carrier 77 of switch 63 and an arm 79 carrying a pivoted latch 80. The latch 80 is normally yieldingly held by a spring 81 so that it has latching engagement with a fixed catch part or shoulder member 82. The latch 80 normally engages the shoulder member 82 to hold the pivoted latch element in the position shown in Fig. 12, in which position the switch 63 is held open.

The control means 65 for the latch means 64 is shown as including a latch lifter 83 carried by one arm of a bell crank 84 which bell crank is operatively connected with a solenoid 85 connected in a circuit controlled by switch 62. The construction is such that when switch 62 is closed the solenoid 85 is energized and the bell crank 84 swung or operated, moving the lifter 83. The lifter 83 is related to the latch 80 so that when the lifter is operated it lifts the latch 80 out of engagement with he shoulder member 82 thus releasing the latch means so that the spring 76 closes switch 63.

The mechanism just described preferably includes a restoring means serving to restore the mechanism to the position shown in Fig. 12 following its operation. In the case illustrated the restoring means involves a push arm 90 projecting from the movable element or core 91ª of the power solenoid 60. The push arm 90 is arranged to engage an operating arm 91 projecting from the pivoted member of the latch means 64. The relationship of parts is such that when the latch means 64 has been released in the manner above described the lever arm 91 moves toward the arm 90 and as the solenoid 60 is energized the arm 90 moves in the direction indicated by the arrow X in Fig. 12, and in so moving swings the pivoted member of the latch means 64 to a position where the latch 80 reengages the shoulder member 82, in which position the contact 75 is retracted and the switch 63 opened. In practice the operation of the mechanism is rapid and the closing of switch 63 through release of the means 64 resulting from energization of switch 62 is immediately followed by resetting or restoring of the mechanism rendering it in condition ready to be operated again.

The mechanism includes, in addition to the structure hereinabove described, a stop 95 which normally extends into or across the passageway of the chute E at a point a short distance below the operating arm 71 of switch 62. The stop 95 is shiftable into and out of position in the passageway of the chute and when it is in the chute it serves as a stop or rest that operates to stop downward movement of a coin carrier A in the chute long enough to allow the mechanism to operate and the desired markings to be printed upon that particular carrier. In the case illustrated the stop 95 is carried on an arm 96 pivotally carried by a pivot pin 97 so that gravity normally acts to hold the parts in position where the stop 95 is across the passageway of the chute.

The structure involves means for releasing the stop or moving it out of the chute in order to release a carrier A immediately following its being marked. In the case illustrated a release arm 98 projects from the case 44 that carries the printing head, the arm 98 being so located as to cooperatively engage an arm 99 projecting from lever 96. The parts are arranged and proportioned so that as the printing head or the case carrying the printing head is moved to position where the carrier A supported by the stop 95 is marked or printed, the arms 98 and 99 cooperate, causing withdrawal of the stop from beneath the said carrier, with the result that immediately upon the carrier being marked or printed it is released and allowed to drop from the chute.

From the wiring diagram shown in Fig. 13 of drawings, it will be apparent how the several electrical elements of the structure are or may be coupled in an electric circuit so that they are all energized from or by means of a common power line L, energy delivered by the power line serving to drive the synchronous motor 36 constantly serving to intermittently energize the solenoid 39, serving to intermittently energize the solenoid 85 whenever the control switch 62 is closed by the presence of a coin carrier A in the chute, and serving to energize the power solenoid 60 in a manner to actuate the printing head whenever the solenoid 85 is energized.

It is to be understood that when a document or object such as a carrier A is introduced into the chute E through the inlet opening 20 gravity acts upon it to move it rapidly down through the chute until it strikes the stop 95. A carrier or article which is merely made of paper such as a card will fall rapidly to the position just stated and if coins are included in the carrier as for instance in an envelope type carrier, they fall to the bottom of the carrier in the course of movement through the chute or even before the carrier is moved into the chute. As the carrier moves to position to be stopped by the stop 95 the switch 62 is operated and the mechanism set into operation in a manner to actuate the printing head causing the time to be stamped upon the stopped carrier, together with any other information that may be required or incidental to the transaction. Upon actuation of the printer head the stop is released from the carrier and the marked carrier dropped into the bin where it is held or stored in a secure manner until such time as the front of the housing is opened and the material in the bin D is removed.

In the form of the invention illustrated in Figs. 14 to 18 of the drawings, the various parts of the machine may be the same except that the control for the operating means H is somewhat different and somewhat simpler than that hereinabove described. The control shown in Figs. 14 to 18 involves, generally, a master or control switch 62ª which governs a relay R which in turn controls the winding of the power solenoid 60ª. In this form of the invention the switch 62ª is carried by the shiftable unit made up of the lever or arm 96ª and the stop 95ª that is carried by the arm 96ª. The operating arm 71ª of switch 62ª projects in a manner to overlie or to be immediately above the stop 95ª and when the stop 95ª is in the normal position across the passage of the chute the arm 71ª is in position to be engaged and operated by a carrier A moving down in the chute to be stopped by the stop 95ª.

The closing of the switch 62ª by operation of the arm 71ª closes relay R which results in energization of the winding of solenoid 60ª, all of which sets the mechanism in operation as hereinabove described. As the printing head moves to position to print upon the carrier A stopped by the stop 95ª the arm 98ª on the case of the printer engages the arm 99ª swinging the lever 96ª to position where the stop 95ª together with the arm 71ª of switch 62ª is moved out of or away from the chute freeing the marked carrier A and allowing the switch 62ª to open so that the mechanism is immediately restored, ready for another operation. As the mechanism moves to the restored position the printing head moves out allowing the lever 96ª to swing by gravity back to the position where the stop 95ª and switch arm 71ª are in position in the chute ready to be actuated by the next carrier A introduced into the machine.

Having described only typical preferred forms and applications of my invention, I do not wish to be limited or restricted to the specific details herein set forth, but wish to reserve to myself any variations or modifications that may appear to those skilled in the art and fall within the scope of the following claims.

Having described my invention, I claim:

1. A machine for receiving and storing an article and recording the time of reception including, a closed housing adapted to receive and store the article, a substantially straight chute with a continuous passage therethrough conducting the article in the housing and depositing it therein, releasable stop means acting to momentarily stop movement of the article in the passage of the chute, an electrically driven clock controlled time printer in the housing, electromagnetic means operating the printer, and a control for the last mentioned means including a control switch having an operating arm at the chute above the stop means adapted to be actuated by the article while stopped by the stop means.

2. A machine for receiving and storing an article and recording the time of reception including, a closed housing adapted to receive and store the article, a chute with a continuous passage therethrough conducting the article in the housing and depositing it therein, releasable stop means acting to momentarily stop movement of the article in the chute, a clock controlled time printer in the housing, operating means for the printer, the stop means including a stop for the article shiftable relative to the chute between an in position where it stops the article and an out position clear of the article, and a control for the operating means including a switch shiftable with the stop between a position where it is operated by the article at the stop when the stop is in the in position and where it is clear of the article when the stop is in the out position.

3. A machine for receiving and storing an article and recording the time of reception including, a closed housing adapted to receive and store the article, a chute with a continuous passage therethrough conducting the article in the housing and depositing it therein, releasable stop means acting to momentarily stop movement of the article in the chute, a clock controlled time printer in the housing, operating means for the printer, the stop means including a stop for the article shiftable relative to the chute between an in position where it stops the article and an out position clear of the article, a control for the operating means including a switch fixed on the chute and having an operating arm above the stop and adapted to be actuated by the article in the chute, and means operated by the printer moving the stop to the out position when the printer is operated.

4. A machine for receiving and storing an article and recording the time of reception including, a closed housing adapted to receive and store the article, a chute with a continuous passage therethrough conducting the article in the housing and depositing it therein, releasable stop means acting to momentarily stop movement of the article in the chute, a clock controlled time printer in the housing, operating means for the printer, the stop means including a stop for the article shiftable relative to the chute between an in position where it stops the article and an out position clear of the article, a control for the operating means including a switch with a control arm and shiftable with the stop between a position where it is operated by the article at the stop when the stop is in the in position and where it is clear of the article when the stop is in the out position, and means operated by the printer moving the stop to the out position when the printer is operated, the arm of the switch being located above the stop.

5. A machine for receiving and confining an article and recording the time of reception thereon including, a closed lock controlled housing having an inlet opening receiving the article, an upright chute in the housing with an opening through it from its upper end to its lower end and conducting the article from the inlet opening and discharging the same from its lower end and into said housing, the chute being straight and the opening through the chute being uniform in size from one end to the other, a clock controlled time printer in the housing operating to print on the article while it is held by the chute, a releasable stop means normally in the chute and adapted to check passage of an article through the chute, means operating the printer, and a control for said means responsive to the article while in the chute and in the course of passing downwardly therethrough, said control including a switch having an operating arm normally in the chute above the stop and operated by the article in the chute.

6. A machine for receiving and confining an article and recording the time of reception thereon including, a closed lock controlled housing adapted to receive and store the article and having an inlet opening receiving the article, a straight chute in the housing with a continuous passage therethrough conducting the article from the opening into the housing below the chute, the opening through the chute being uniform in size from one end to the other, a releasable stop normally in the chute to stop an article in a predetermined position in the chute, a clock controlled time printer in the housing operating to print on the article while it is held by the stop in said predetermined position in the chute, means operating the printer, a control for said means responsive to the article while in the chute, said control including a switch with an operating arm and means supporting the switch to shift relative to the chute between a position where the arm is operated by the article above the stop and a position where the arm is removed from the article, and means operating the switch to the last named position upon operation of the first mentioned means.

7. A machine for receiving and storing an article and recording the time of reception thereon including, a closed lock controlled housing adapted to receive and store the article and having an inlet opening receiving the article, a substantially straight chute in the housing with a continuous passage therethrough conducting the article from the opening into the housing below the chute, the passage being of uniform size from one end to the other, a releasable stop in the chute adapted to stop an article in a predetermined position in the chute, a clock controlled time printer in the housing operating to print on the article while held by the chute and located in said position by the stop, means operating the printer, a control for said means responsive to the article while in the chute, said control including a switch with an operating arm and means pivotally supporting the switch to shift relative to the chute between a normal position where the arm is at the chute and above the stop to be operated by the article in the chute and a retracted position where the arm is removed from the article, and means operated by the printer moving the switch to the last named position.

8. A machine for receiving and storing an article and recording the time of reception thereon including, a closed lock controlled housing adapted to receive and store the article and having an inlet opening receiving the article, a substantially straight chute in the housing with a continuous passage therethrough conducting the article from the opening into the housing below the chute, the passage being of uniform size from one end to the other, a releasable stop in the chute adapted to stop an article in a predetermined position in the chute, a clock controlled time printer in the housing operating to print on the article while held by the chute and located in said position by the stop, electromagnetic means operating the printer, and a control for said means responsive to the article while in the chute, said control including, a switch controlling a circuit to the electromagnetic means, and a control switch governing action of the first mentioned switch and having an operating arm at the chute above the stop to be operated by the article in the chute above the stop.

9. A machine for receiving and storing an article and recording the time of reception thereon including, a closed lock controlled housing adapted to receive and store the article and having an inlet opening receiving the article; a substantially straight chute in the housing with a continuous passage therethrough conducting the article from the opening into the housing below the chute, a stop adapted to releasably stop an article in a predetermined position in the chute, a clock controlled time printer in the housing operating to print on the article while held by the chute and supported in said position by the stop, electromagnetic means operating the printer, and a control for said means responsive to the article while in the chute, said control including a circuit to the electromagnetic means, a switch in said circuit, latch means normally holding said switch open, an electromagnetic release for the latch means, and a control switch for the release having an operating arm at the chute above the stop adapted to be actuated by the article in the chute.

10. A machine for receiving and storing an article and recording the time of reception thereon including, a closed lock controlled housing adapted to receive and store the article and having an inlet opening receiving the article, a substantially straight chute in the housing with a continuous passage therethrough conducting the article from the opening into the housing below the chute, a stop adapted to releasably stop articles in a predetermined position in the chute, a clock controlled time printer in the housing operating to print on the article while held by the chute, electromagnetic means operating the printer, and a control for said means responsive to the article while in the chute, said control including a circuit to the electromagnetic means, a switch in said circuit, latch means normally holding said switch open, an electromagnetic release for the latch means, a control switch for the release having an operating arm at the chute above the stop adapted to be actuated by the article in the chute, and means restoring the latch means following release and operation of the printer.

11. A machine for receiving and storing an article and recording the time of reception including, a closed housing adapted to receive and retain the article, a substantially straight chute with a continuous passage therethrough conducting the article in the housing and finally depositing it therein, releasable stop means acting to momentarily stop movement of the article in the passage of the chute, a clock controlled time printer in the housing, means operating the printer, and a control for the last mentioned means including a control element at the chute above the stop means adapted to be operated by the article while stopped by the stop means.

CHESTER A. FRICK.

References Cited in the file of this patent

UNITED STATES PATENTS

| Number | Name | Date |
|---|---|---|
| 428,103 | Jaynes | May 20, 1890 |
| 505,062 | Ongley | Sept. 12, 1893 |
| 588,668 | Van der Valk | Aug. 24, 1897 |
| 696,572 | Krumm | Apr. 1, 1902 |
| 793,231 | Rowley | June 27, 1905 |
| 1,259,399 | Hipwell et al. | Mar. 12, 1918 |
| 2,127,897 | Watkins | Aug. 23, 1938 |
| 2,201,355 | Streckfuss | May 21, 1940 |
| 2,362,392 | Molden et al. | Nov. 7, 1944 |
| 2,377,407 | Dell | June 5, 1945 |
| 2,501,904 | Jonsson | Mar. 28, 1950 |